United States Patent
Ishizaki et al.

(10) Patent No.: US 7,024,293 B2
(45) Date of Patent: Apr. 4, 2006

(54) COLLISION DETERMINATION SYSTEM

(75) Inventors: Tatsuya Ishizaki, Wako (JP); Kazuo Matsuda, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 4 days.

(21) Appl. No.: 10/608,676

(22) Filed: Jun. 24, 2003

(65) Prior Publication Data
US 2004/0002815 A1  Jan. 1, 2004

(30) Foreign Application Priority Data
Jun. 25, 2002  (JP)  ............... 2002-183964
Jun. 25, 2002  (JP)  ............... 2002-183998

(51) Int. Cl.
B60K 28/14  (2006.01)
B60R 22/00  (2006.01)

(52) U.S. Cl. .................. 701/45; 701/36; 180/271
(58) Field of Classification Search .......... 701/45, 701/36; 280/728.1, 735; 180/271, 282; 340/436
See application file for complete search history.

(56) References Cited

U.S. PATENT DOCUMENTS

| | | | | |
|---|---|---|---|---|
| 5,173,614 A | * | 12/1992 | Woehrl et al. | ............ 307/10.1 |
| 5,737,224 A | * | 4/1998 | Jeenicke et al. | ............... 701/45 |
| 6,113,138 A | * | 9/2000 | Hermann et al. | ........... 280/735 |
| 6,125,313 A | * | 9/2000 | Watanabe et al. | ............. 701/45 |
| 6,216,070 B1 | * | 4/2001 | Hayashi et al. | ............... 701/45 |
| 6,353,782 B1 | * | 3/2002 | Kunimi et al. | ................ 701/45 |
| 2002/0033755 A1 | | 3/2002 | Ishizaki et al. | |

FOREIGN PATENT DOCUMENTS

JP  2001080545 A  3/2001

* cited by examiner

Primary Examiner—Thomas G. Black
Assistant Examiner—Dalena Tran
(74) Attorney, Agent, or Firm—Hamre, Schumann, Mueller & Larson, P.C.

(57) ABSTRACT

A collision determination system of the present invention includes a plurality of acceleration sensors provided in a bumper face of a vehicle for detecting the acceleration of deformation of the bumper face when the vehicle collides with an object. The system also includes an actuation permitter which, even when one of the acceleration sensors detects an acceleration equal to or more than a set value and it is determined that a collision occurs, refers to another acceleration sensor for operation. Under the AND conditions that an actuation permitting signal is supplied from the actuation permitter and a collision detection signal is supplied from a collision detector, an actuating signal output outputs an actuating signal for actuating collision mitigating devices.

10 Claims, 12 Drawing Sheets

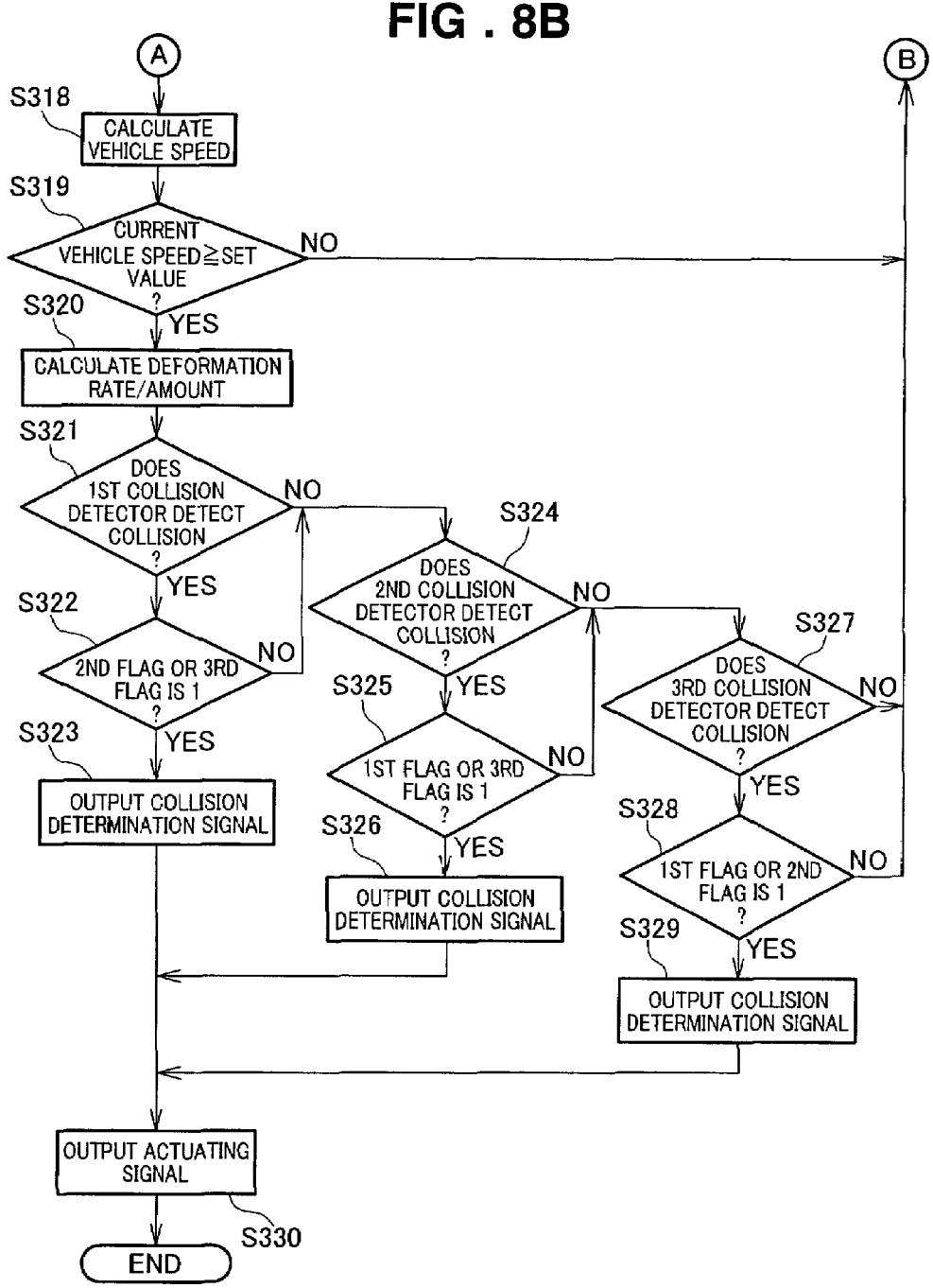

COLLISION DETERMINATION SYSTEM

FIELD OF THE INVENTION

The present invention relates to a collision determination system and, more particularly, to a collision determination system for detecting a collision of a vehicle with an object of protection and outputting an actuating signal to hood actuators.

BACKGROUND OF THE INVENTION

As an exemplary conventional art, a collision determination system in a "Vehicle Hood Actuating System" of Japanese Patent Laid-Open Publication No. 2001-80545 is cited. FIG. 11 is an overall view showing the vehicle hood actuating system having the collision determination system. In the vehicle hood actuating system, the collision determination system consists of a speed sensor 501 for detecting the vehicle speed, an acceleration sensor 503 for detecting an acceleration acting on a bumper 502 upon a collision of a vehicle 500 with an object of protection M, a deformation rate calculator 504 for calculating a bumper deformation rate from the information of acceleration detected by the acceleration sensor 503, a smoothing processor 505, a speed-threshold map 506 for varying the threshold of the bumper deformation rate in accordance with the vehicle speed, a hood actuating device including actuators 508 for holding up the proximal ends of a hood 509 by a predetermined amount, and an electric control unit (ECU) 507 for controlling the operation of the actuators 508. When a vehicle speed detected by the speed sensor 501 is a predetermined vehicle speed and a calculated bumper deformation rate exceeds the threshold, the control unit 507 determines that the collision object is a predetermined object of protection M and operates the actuators 508 to lift the hood 509 at their proximal ends. The hood actuating device lifts the hood 509, thereby mitigating the impact of a secondary collision of the protection object M with the hood 509.

In the above-described collision determination system, if a malfunction occurs in an acceleration sensing element, electric circuit or the like in the acceleration sensor 503, an invalid signal (acceleration signal of a great acceleration as provided upon the occurrence of collision) due to the malfunction may be supplied from the acceleration sensor 503 though in a no-collision state. Misidentifying the invalid signal as a normal valid signal, the control unit 507 may determine that a collision occurs and actuate the hood 509.

Air bag systems have employed a collision determination system having an impact sensor for sensing an impact of above a certain level provided in a control unit, which system being configured not to actuate air bags when the impact sensor detects nothing, even if a collision determination signal is supplied from the control unit. The impact sensor, however, is provided in the control unit and can only sense an impact sufficiently large to actuate air bags.

In a collision with an object of as small a weight as a pedestrian as a protection object of a collision determination system of the present invention, impact occurs only near a bumper as a colliding area. The impact sensor provided in the control unit as described above cannot sense a collision with an object of as small a weight as a pedestrian.

It might be possible to mount the control unit at the front end of a vehicle. It is, however, difficult to place the control unit in such a narrow space as a vehicle front end portion. Therefore the above-described impact determination system for use in air bag systems cannot be used for a collision determination system for actuating hood actuators, which is the subject matter of the present invention.

Thus desired is a collision determination system having a control unit which reliably determines whether a vehicle collides with an object and outputs an actuating signal as appropriate, even when an invalid signal due to a malfunction in an acceleration sensing element, electrical circuit or the like in an acceleration sensor is supplied.

SUMMARY OF THE INVENTION

According to the present invention, there is provided a collision determination system for detecting a collision of a vehicle with an object and outputting an actuating signal to collision mitigating devices, which system comprises: a plurality of acceleration sensors mountable to a front portion of the vehicle to detect accelerations of movement of the front portion in the vehicle longitudinal direction; an actuation permitter for outputting an actuation permitting signal for a fixed time period when one of the acceleration sensors detects an acceleration equal to or more than a set value within a set time after another acceleration sensor detects an acceleration equal to or more than the set value; a collision detector for outputting a collision detection signal when determining that a collision with a given object occurs based on acceleration detected by at least one of the acceleration sensors; and an actuating signal output for outputting an actuating signal to the collision mitigating devices when receiving both an actuation permitting signal from the actuation permitter and a collision detection signal from the collision detector.

Thus, in the collision determination system of this invention, even when one of the acceleration sensors detects an acceleration equal to or more than the set value by the malfunction of the acceleration sensor and a collision signal is provided, the output of an actuating signal due to the malfunction of the acceleration sensor can be prevented by referring to another acceleration sensor.

In the present invention, a control unit including the actuation permitter, collision detector and actuating signal output is preferably mounted in a position different from that of the acceleration sensors. Even when an acceleration signal of a large acceleration as supplied at the occurrence of collision is supplied by the malfunction of an acceleration sensing element, electric circuit or the like in one of the acceleration sensors, the control unit provided in a position different from that of the acceleration sensors can thus reliably detect whether the vehicle collides with an object and output an actuating signal as appropriate. This is preferable for collision determination systems for collision mitigating devices because collision determination systems used in air bag systems and having impact sensors in control units cannot detect such collisions as causing impacts only near bumpers as colliding areas, which are the subject of the present invention. Further, limitations on the mounting position of the control unit can be eliminated.

Further, in the present invention, there is provided a collision determination system for detecting a collision of a vehicle with an object and outputting an actuating signal to collision mitigating devices, which system comprises: a plurality of acceleration sensors mountable to a front portion of the vehicle to detect accelerations of movement of the front portion in the vehicle longitudinal direction; a plurality of collision detectors provided in correspondence with the respective acceleration sensors to perform calculations with the detected accelerations detected by the acceleration sensors, thereby to detect a collision of the vehicle with the object; a plurality of acceleration comparators provided in correspondence with the respective acceleration sensors to determine whether or not the detected accelerations detected by the acceleration sensors are equal to or more than a set value; and an actuating signal output for outputting an actuating signal when determining that any of the collision detectors detects a collision and any of the acceleration comparators referring to the corresponding acceleration sensor which is different from the acceleration sensor referred to by the collision detector detecting the collision has detected an acceleration equal to or more than the set value during a past time period before the collision detection.

According to the above collision determination system, collision determination is not made soon after one of the collision detectors referring to the corresponding acceleration sensor detects a collision, but is made by checking whether the acceleration of another acceleration sensor has been equal to or more than the set value during a past time period before the collision detection. Even if an acceleration signal of a large acceleration as supplied at the occurrence of collision is supplied by the malfunction of an acceleration sensing element or electric circuit in one of the acceleration sensors, collision determination is not made when the acceleration of another acceleration sensor is less than the set value, so that an actuating signal is not supplied to actuate the collision mitigating devices.

Further in the present invention, the actuating signal output outputs an actuating signal under such conditions that any of the collision detectors detects a collision and any of the acceleration comparators referring to the acceleration sensor mounted adjacent to the acceleration sensor referred to by the collision detector detecting the collision has detected an acceleration equal to or more than the set value during a past time period before the collision detection. That is, an actuating signal is supplied when the acceleration detected by the acceleration sensor mounted adjacent to the acceleration sensor referred to by the collision detector detecting the collision is equal to or more than the set value, so that collision determination is reliably made to actuate the collision mitigating devices.

A control unit including the collision detectors, acceleration comparators and actuating signal output is preferably mounted in a position different from that of the acceleration sensors.

BRIEF DESCRIPTION OF THE DRAWINGS

Preferred embodiments of the present invention will be described in detail below, by way of example only, with reference to the accompanying drawings, in which:

FIGS. 8A and 8B are flowcharts showing the operation of the collision determination system according to the second embodiment shown in FIG. 7;

DETAILED DESCRIPTION OF THE PREFERRED EMBODIMENTS

Initial reference is made to FIGS. 1–5B inclusive, which illustrate a collision determination system in a first embodiment of the present invention. In a vehicle front end portion 1 shown in FIG. 1, acceleration sensors 2a and 2b are provided. The acceleration sensors 2a and 2b are connected to an ECU (electric control unit) 7 mounted in the vehicle. Any transmission means (such as radio) rather than cables may be used for connection between the acceleration sensors 2a and 2b and the ECU 7.

The acceleration sensors 2a and 2b are each configured in a unit as large as a matchbox, including a well known capacitance-type acceleration sensing element and electrical circuit. A weight is provided in the acceleration sensing element. The acceleration sensors 2a and 2b transmit acceleration signals to the ECU 7 according to detected accelerations due to a collision.

Figure 1:
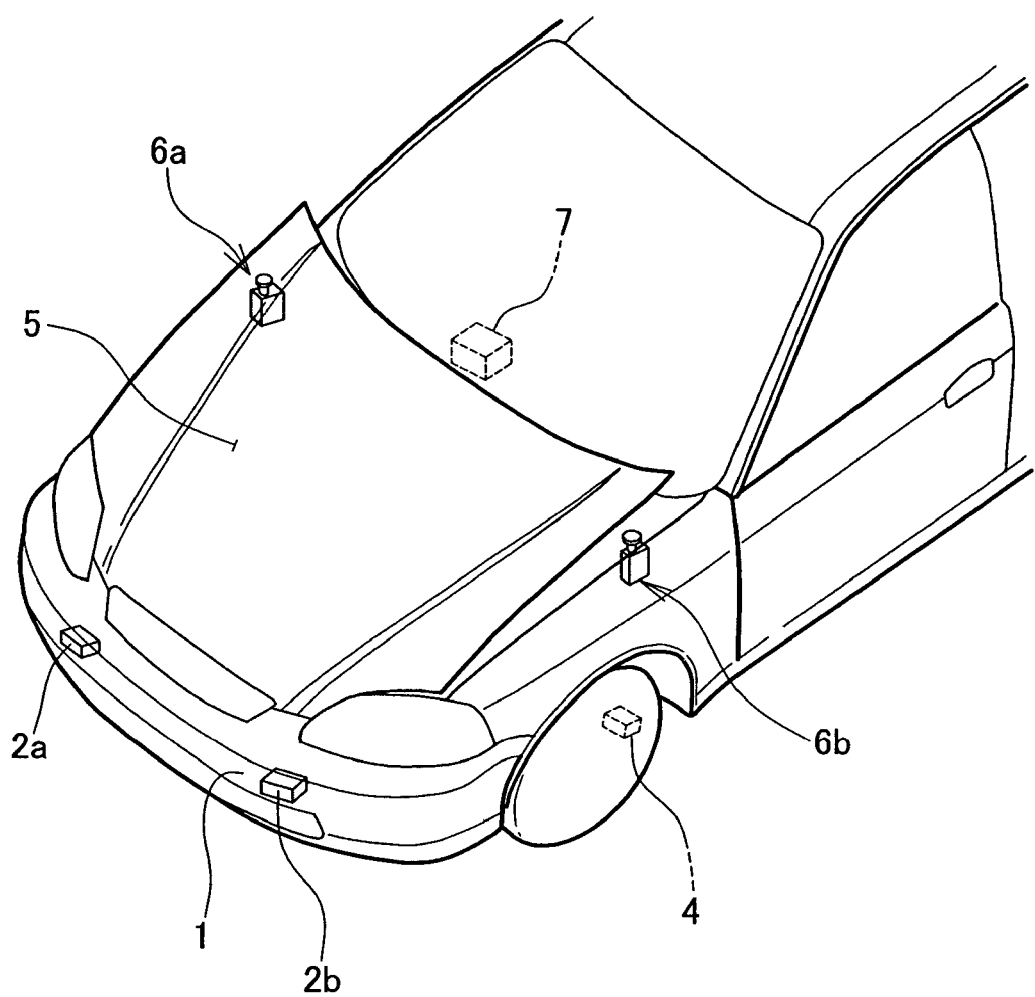
FIG. 1 is a perspective view of a vehicle equipped with a collision determination system according to a first embodiment of the present invention with two acceleration sensors provided in a vehicle front portion.

The ECU 7 outputs an actuating signal to a right actuator 6a and a left actuator 6b, controlling the actuation. The right and left actuators 6a and 6b are hood lifting devices. The right and left actuators 6a and 6b actuate to hold up the hood 5. FIG. 1 illustrates the hood 5 in a lifted states. The ECU 7 makes a collision determination based on the received acceleration signals on acceleration values. When determining that the vehicle front end portion 1 has collided with an object, the ECU 7 actuates the right and left actuators 6a and 6b to lift the hood 5 to a predetermined level. As a result, impact in a secondary collision of the object with the hood 5 is mitigated.

Now, the detection of acceleration due to collision will be described with reference to FIGS. 2 and 3.

The acceleration sensors 2a and 2b are provided on the inner surface of a bumper face 3 covering the front of a front bumper 3A at the vehicle front end portion 1. Chain double-dashed lines in FIG. 3 show the position of the bumper face 3 before collision. When the bumper face 3 moves rightward in the figure (rearward of the vehicle) by a collision with an object M, the weights in the acceleration sensing elements move by inertia in the direction opposite to the direction "a" of acceleration caused by the movement of the bumper face 3. Variations in capacitance caused by the movements of the weights are taken by the electric circuits as acceleration values.

The acceleration sensors 2a and 2b detect accelerations caused by the movement of the bumper face 3 using variations in capacitance caused by the movements of the weights in the acceleration sensing elements as described above. The above-described detection of acceleration of the bumper face 3 moving by collision eliminates the need for providing sensors transversely over the overall length of the bumper face 3 as load sensors for directly detecting force. Thus in this embodiment, the two acceleration sensors 2a and 2b are provided transversely at the bumper face 3.

In the first embodiment, the acceleration sensors 2a and 2b are provided at the bumper face 3 of the vehicle front end portion 1, which is not limiting. Acceleration sensors may be attached to a bracket deformable like the bumper face. Alternatively, acceleration sensors may be provided at the side or rear of a vehicle so as to determine a side collision or a collision from behind.

Figure 4:
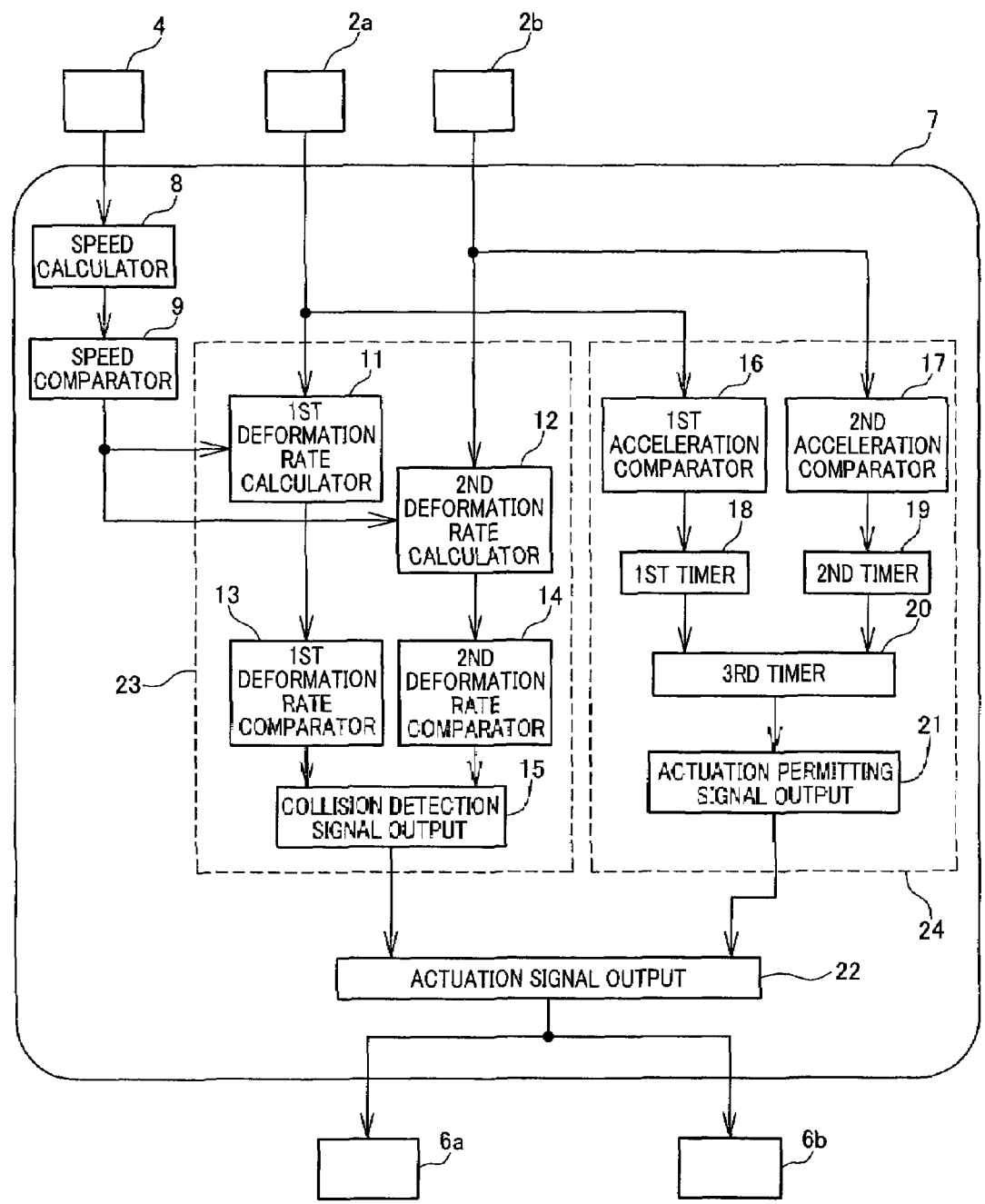
FIG. 4 is an electrical functional block diagram of an ECU in the collision determination system according to the first embodiment of the present invention.

As shown in FIG. 4, the ECU 7 includes a speed calculator 8, speed comparator 9, collision detector 23, actuation permitter 24 and actuating signal output 22. The collision detector 23 includes a first deformation rate calculator 11 and a second deformation rate calculator 12 which receive detected accelerations from the acceleration sensors 2a and 2b, a first deformation rate comparator 13 and a second deformation rate comparator 14 for comparing deformation rates calculated in the first deformation rate calculator 11 and the second deformation rate calculator 12 with a set value, and a collision detection signal output 15 for outputting a collision detection signal based on the results of comparisons made by the first deformation rate comparator 13 and the second deformation rate comparator 14.

The actuation permitter 24 includes a first acceleration comparator 16 and a second acceleration comparator 17 which receive detected accelerations from the acceleration sensors 2a and 2b, a first timer 18 and a second timer 19 which refer to the first acceleration comparator 16 and the second acceleration comparator 17, a third timer 20 which refers to the first timer 18 and the second timer 19, and an actuation permitting signal output 21 which refers to the third timer 20.

The actuating signal output 22 receives a collision detection signal supplied from the collision detection signal output 15 in the collision detector 23 and an actuation permitting signal supplied from the actuation permitting signal output 21 in the actuation permitter 24.

The speed calculator 8 receives a pulse signal supplied from a speed sensor 4 and calculates the current vehicle speed from the pulse period. The speed comparator 9 makes a comparison to determine whether the current vehicle speed is equal to or more than a set speed. When determining that the current vehicle speed is equal to or more than a set value, the speed comparator 9 transmits a speed comparison signal to the first and second deformation rate calculators 11 and 12. The first and second deformation rate calculators 11 and 12 having received the speed comparison signal calculate deformation rates based on detected accelerations transmitted from the right and left acceleration sensors 2a and 2b, respectively.

The first deformation rate calculator 11 stores detected accelerations having been supplied from the right acceleration sensor 2a from a fixed time ago to that moment, and determines the deformation rate by the integration calculation of the detected accelerations. The second deformation rate calculator 12 stores detected accelerations having been supplied from the left acceleration sensor 2b from a fixed time ago to that moment, and determines the deformation rate by the integration calculation of the detected accelerations.

The first deformation rate comparator 13 determines whether or not the deformation rate calculated by the first deformation rate calculator 11 is equal to or more than the set value, and outputs a deformation rate comparison signal. Similarly, the second deformation rate comparator 14 determines whether or not the deformation rate calculated by the second deformation rate calculator 12 is equal to or more than the set value, and outputs a deformation rate comparison signal. The collision detection signal output 15 outputs a collision detection signal when receiving a deformation rate comparison signal from either of the first and second deformation rate comparators 13 and 14.

The first acceleration comparator 16 determines whether or not the detected acceleration supplied from the right acceleration sensor 2a is equal to or more than the set value. When determining that the detected acceleration is equal to or more than the set value, the first acceleration comparator 16 outputs an acceleration comparison signal to the first timer 18. The first timer 18 starts and then stops at the time when a set time elapses.

The second acceleration comparator 17 determines whether or not the detected acceleration supplied from the left acceleration sensor 2b is equal to or more than the set value. When determining that the detected acceleration is equal to or more than the set value, the second acceleration comparator 17 outputs an acceleration comparison signal to the second timer 19. The second timer 19 starts and then stops at the time when a set time elapses.

The third timer 20 starts when determining that both the first and second timers 18 and 19 are in operation, and stops at the time when a set time elapses. The actuation permitting signal output 21 outputs an actuation permitting signal for a fixed time period when determining that the third timer 20 is in operation. That is, at the time when either of the right and left acceleration sensors 2a and 2b detects an acceleration equal to or greater than the set value while the timer 19 (or 18) associated with the other acceleration sensor 2b (or 2a) operates upon the detection of an acceleration equal to or more than the set value by the acceleration sensor 2b (or 2a), the actuation permitting signal output 21 outputs an actuation permitting signal for a fixed time period.

The actuating signal output 22 outputs an actuating signal to the actuators 6a and 6b when receiving both an actuation permitting signal from the actuation permitting signal output 21 and a collision detection signal from the collision detection signal output 15.

Figure 5A:
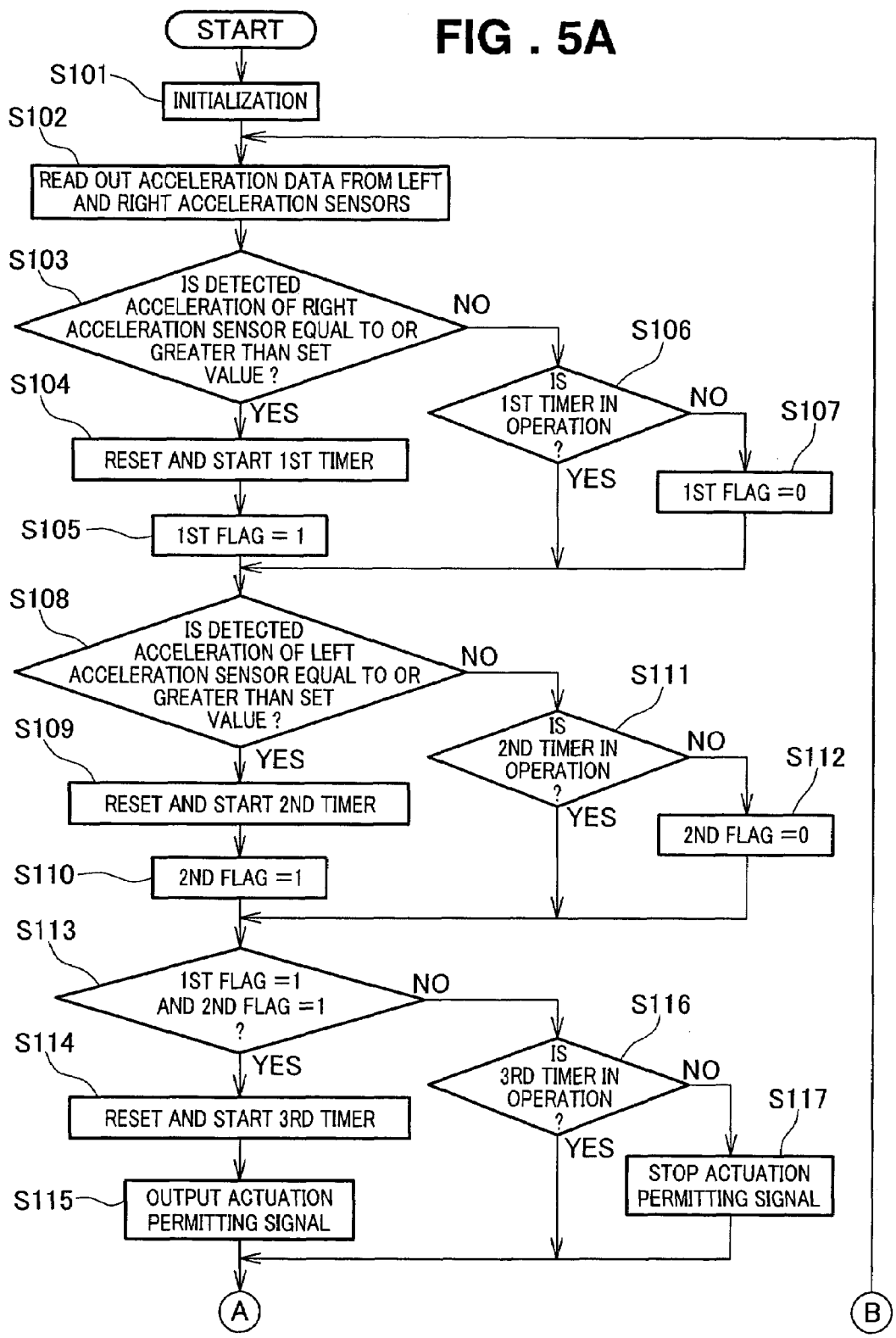
FIGS. 5A and 5B are flowcharts of the operation of the collision determination system shown in FIG. 4.

Now, an operation of the collision determination system according to the first embodiment of the present invention will be described with reference to flowcharts shown in FIGS. 5A and 5B.

At the start of operation of the collision determination system, first in step S101, various parameters (vehicle speed, deformation rate and flags) for use in collision determination are initialized.

Detected accelerations supplied from the right and left acceleration sensors 2a and 2b are read (step S102), and it is determined whether the detected acceleration of the right acceleration sensor 2a is equal to or more than the set value (step S103). When it is determined that the detected acceleration is equal to or more than the set value, the timer value of the first timer 18 is reset to start (step S104) and the value of a first flag is set at 1 (step S105).

When it is determined that the detected acceleration is less than the set value in step S103, it is checked whether or not the first timer 18 has already operated (step S106). When the first timer 18 is in operation, the process proceeds to step S108, and when not, the value of the first flag is set at 0 (step S107).

Through the operation of steps S103 to S107, once the detected acceleration of the right acceleration sensor 2a becomes equal to or more than the set value, the value of the first flag is 1 for a fixed time period even if the detected acceleration then becomes less than the set value during that period. Specifically, if the value of the first flag is set at 0 after it is once determined that the detected acceleration of the right acceleration sensor 2a is equal to or more than the set value, no actuation permitting signal is provided for actuating the actuators 6a and 6b even when a collision is detected as described with FIG. 5B. It is thus necessary to maintain the first flag at 1 within the set time of the first timer 18 to prevent the value of the first flag from becoming 0 in steps S106 and S107. The same is true for steps S111 and S112 and steps S116 and S117 to be described below.

Then it is determined whether the detected acceleration supplied from the left acceleration sensor 2b is equal to or more than the set value (step S108). When it is determined that the detected acceleration is equal to or more than the set value, the timer value of the second timer 19 is reset to start (step S109), and the value of a second flag is set at 1 (step S110).

When the detected acceleration is less than the set value in step S108, it is checked whether or not the second timer 19 has already operated (step S111). When the second timer 19 is in operation, the process proceeds to step S113, and when not, the value of the second flag is set at 0 (step S112). Through the operation of steps S108 to S112, once the detected acceleration of the left acceleration sensor 2b becomes equal to or more than the set value, the value of the second flag is 1 for a fixed time period even if the detected acceleration then becomes less than the set value during that period.

Then it is determined whether both of the first and second flags are 1 (step S113). When both of the first and second flags are 1, the timer value of the third timer 20 is reset to start (step S114), and an actuation permitting signal is provided (step S115).

When one of the first and second flags is 0 in step S113, it is determined whether the third timer is in operation (step S116). When the third timer is in operation, the process proceeds to step S118, and when not, proceeds to step S117. In step S117, the output of an actuation permitting signal is stopped. Through the operation of steps S113 to S117, once both of the first and second flags become 1, an actuation permitting signal is provided for a fixed time period even if either of the first and second flags becomes 0 during that period.

Figure 5B:
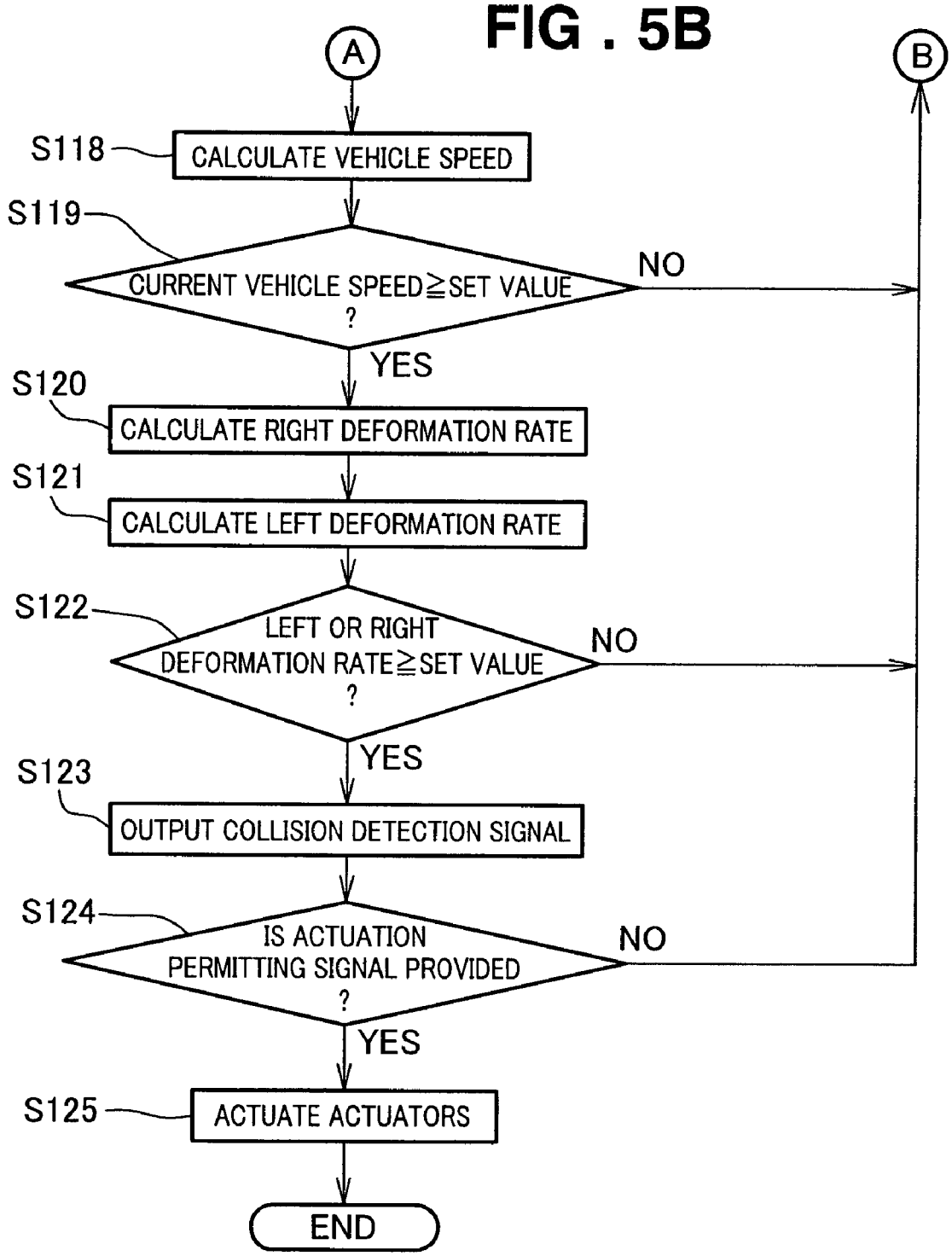

As shown in FIG. 5B, in step S118, the speed calculator 8 calculates the current vehicle speed to determine whether the current vehicle speed is equal to or more than the set value (step S119). When the current vehicle speed is equal to or more than the set value, the process proceeds to step S120. When the current vehicle speed is less than the set value, the process returns to step S102. In step S120, the deformation rate is calculated based on the detected accelerations of the right acceleration sensor 2a.

In step S121, the deformation rate is calculated based on the detected accelerations of the left acceleration sensor 2b. It is determined whether at least one of the left and right deformation rates calculated in steps S120 and S121 is equal to or more than the set value (step S122). When it is determined that at least one of the left and right deformation rates is equal to or more than the set value, a collision detection signal is provided (step S123). When both of the left and right deformation rates are less than the set value, the process returns to step S102.

It is determined whether an actuation permitting signal is provided (step S124). When an actuation permitting signal is provided, the actuators 6a and 6b are actuated (step S125). When no actuation permitting signal is provided, the process returns to step S102. When the process proceeds to step S125 to actuate the actuators 6a and 6b, the operation is finished.

The first embodiment has been described with the two acceleration sensors 2a and 2b. The number of acceleration sensors is not limited to two and may be three or more.

As described above, according to the collision determination system of the first embodiment, even when one of a plurality of acceleration sensors outputs by malfunction an acceleration signal corresponding to acceleration at the occurrence of collision and a collision detection signal is provided, the output of an actuating signal due to the malfunction of the acceleration sensor can be prevented by referring to another acceleration sensor.

Now, a collision determination system according to a second embodiment with three acceleration sensors provided in a front end portion of a vehicle will be described with reference to FIGS. 6 to FIGS. 8A and 8B inclusive.

Figure 6:
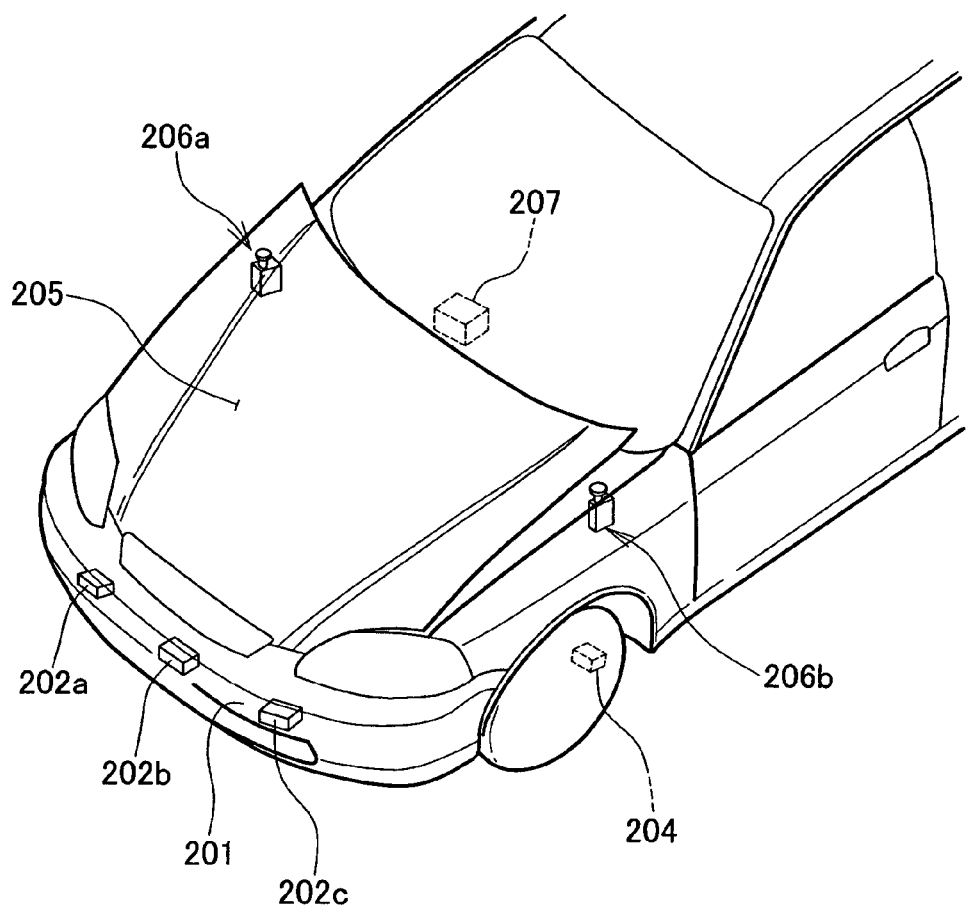
FIG. 6 is a perspective view of a vehicle equipped with a collision determination system according to a second embodiment of the present invention with three acceleration sensors provided in a vehicle front portion.

In a vehicle front end portion 201 shown in FIG. 6, acceleration sensors 202a, 202b and 202c are provided. The acceleration sensors 202a, 202b and 202c are connected to an ECU (electric control unit) 207 provided within a passenger compartment. Any means (such as radio) rather than wire cables may be used for connection between the acceleration sensors 202a, 202b and 202c and the ECU 207.

The acceleration sensors 202a, 202b and 202c each have the same configuration as the acceleration sensors described with FIG. 1. The acceleration sensors 202a, 202b and 202c transmit acceleration signals to the ECU 207 according to detected accelerations caused by collision.

The ECU 207 outputs an actuating signal to a right actuator 206a and a left actuator 206b, controlling the actuation. The right and left actuators 206a and 206b are hood lifting devices. The right and left actuators 206a and 206b actuated lift a hood 205. FIG. 6 shows the hood 205 in a lifted state. The ECU 207 performs collision determination based on received acceleration signals on acceleration values, and, when determining that the front end portion 201 of the vehicle has collided with an object, actuates the right and left actuators 206a and 206b to lift the hood 205 to a predetermined level. As a result, impact in a secondary collision of the object with the hood 205 is mitigated.

Acceleration comparators and collision detectors associated with the respective three acceleration sensors 202a, 202b and 202c are provided in the ECU 207.

Figure 2:
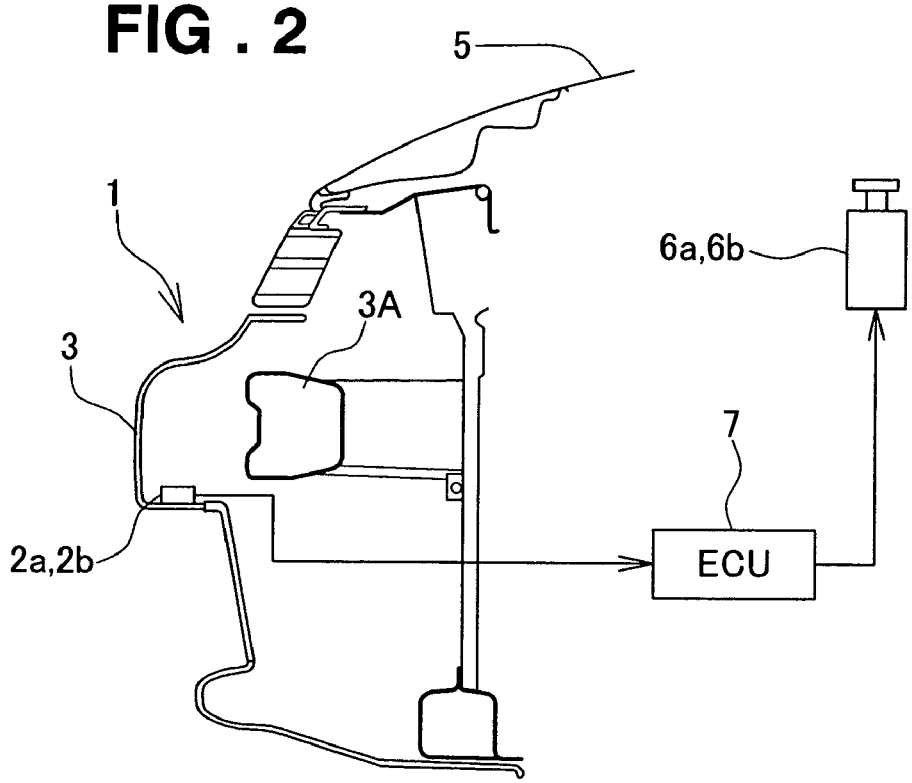
FIG. 2 is a cross-sectional view before a collision of a vehicle front end portion provided with the acceleration sensors.
Figure 3:
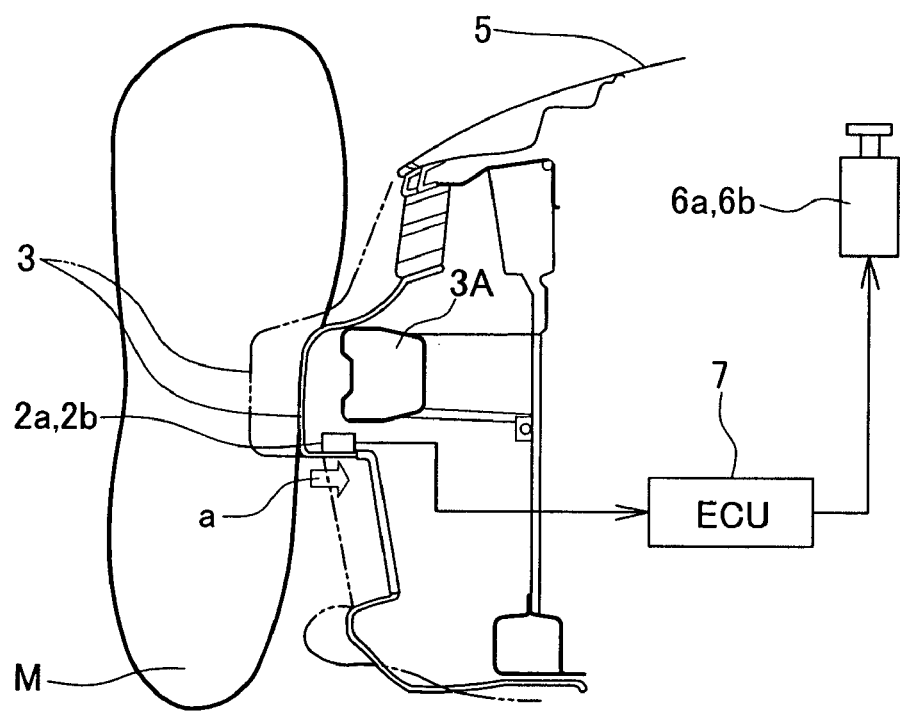
FIG. 3 is a cross-sectional view during a collision of the vehicle front end portion provided with the acceleration sensors.

The mounting of the three acceleration sensors 202a, 202b and 202c to a bumper and the detection of acceleration are done in the same manner as in the first embodiment described with FIGS. 2 and 3.

Figure 7:
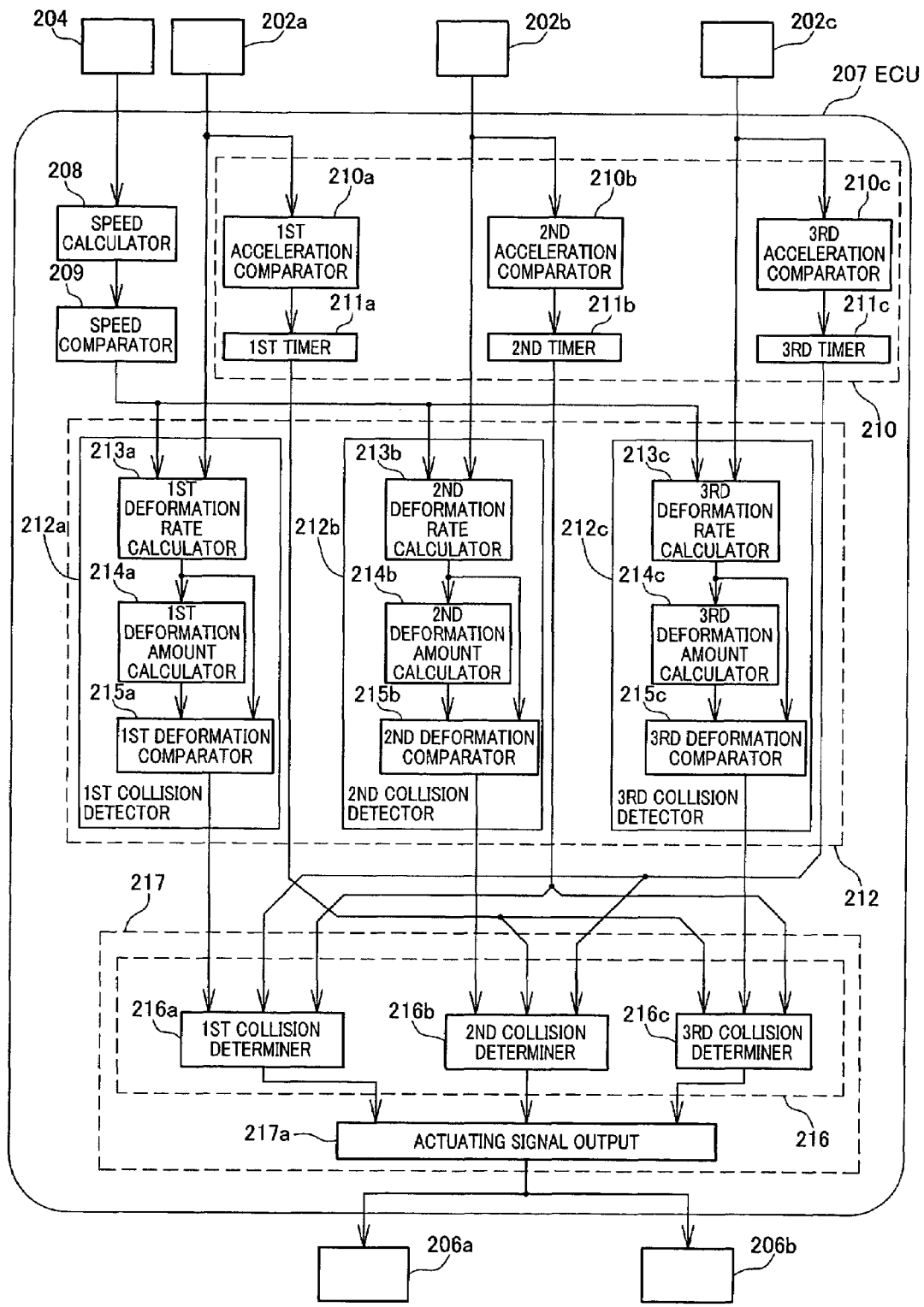
FIG. 7 is an electrical functional block diagram of an ECU in the collision determination system according to the second embodiment of the present invention.

As shown in FIG. 7, the ECU 207 in the second embodiment consists of an acceleration comparator 210, a collision detector 212, and an actuating signal output 217.

The acceleration comparator 210 consists of a first acceleration comparator 210a, second acceleration comparator 210b and third acceleration comparator 210c which receive acceleration signals from the acceleration sensors 202a, 202b and 202c, and a first timer 211a, second timer 211b and third timer 211c paired with the comparators 210a, 210b and 210c, respectively.

The collision detector 212 has a first collision detector 212a, second collision detector 212b and third collision detector 212c which receive acceleration signals for collision detection.

The actuating signal output 217 has a collision determiner 216 and an actuating signal output 217a. The collision determiner 216 consists of a first collision determiner 216a, second collision determiner 216b and third collision determiner 216c. In FIG. 7, the first acceleration comparator 210a, second acceleration comparator 210b and third acceleration comparator 210c have substantially the same function. The first timer 211a, second timer 211b and third timer 211c also have substantially the same function. The first collision detector 212a, second collision detector 212b and third collision detector 212c also have substantially the same function. Thus description will be made below about the operations of the first acceleration comparator 210a, first timer 211a and first collision detector 212a.

The first acceleration comparator 210a refers to the first acceleration sensor 202a to determine whether or not an acceleration detected by the first acceleration sensor 202a is equal to or more than a set value. When the comparison shows that the acceleration is equal to or more than the set value, an acceleration comparison signal is supplied to the first timer 211a, and the first timer 211a starts. The first timer 211a stops at the time when a predetermined time elapses after the start. That is, the first timer 211a is in operation for a predetermined time period after starting upon the determination of the first acceleration comparator 210a that the acceleration is equal to or more than the set value. This is for collision determination based on the fact that a collision signal to be described below is provided during the predetermined time period after an acceleration equal to or more than the set value is detected.

The second acceleration comparator 210b and third acceleration comparator 210c and the second timer 211b and third timer 211c make comparisons and start based on accelerations detected by the second acceleration sensor 202b and third acceleration sensors 202c, respectively, in the same manner as the first acceleration comparator 210a and the first timer 211a. The operating states of the first timer 211a and second timer 211b are referred to by the third collision determiner 216c. The operating states of the second timer 211b and third timer 211c are referred to by the first collision determiner 216a. The operating states of the first timer 211a and third timer 211c are referred to by the second collision determiner 216b.

The ECU 207 has a speed calculator 208 which receives a pulse signal supplied from a speed sensor 204 and calculates the vehicle speed, and a speed comparator 209 for comparing the calculated vehicle speed with a set speed.

The speed calculator 208 calculates the current vehicle speed from the pulse period of a pulse signal supplied from the speed sensor 204. The speed comparator 209 makes a comparison to determine whether or not the current vehicle speed calculated by the speed calculator 208 is equal to or more than the set speed, and, when the answer is yes, transmits a speed comparison signal to the first, second and third collision detectors 212a, 212b and 212c.

The first, second and third collision detectors 212a, 212b and 212c use the speed comparison signal on the determination by the speed comparator 209 that the current vehicle speed is equal to or more than the set value, for the operation of collision detection based on accelerations supplied from the first, second and third acceleration sensors 202a, 202b and 202c.

The first collision detector 212a consists of a first deformation rate calculator 213a, first deformation amount calculator 214a and first deformation comparator 215a. The second collision detector 212b consists of a second deformation rate calculator 213b, second deformation amount calculator 214b and second deformation comparator 215b. The third collision detector 212c consists of a third deformation rate calculator 213c, third deformation amount calculator 214c and third deformation comparator 215c. In a description below, the operation of the first collision detector 212a will be described.

The first deformation rate calculator 213a stores accelerations which have been detected by the first acceleration sensor 202a for a fixed time period, and determines the deformation rate of a bumper face 203 from the value of the integration calculation of the accelerations in the fixed time period.

The first deformation amount calculator 214a stores deformation rates of the bumper face 203 which have been calculated by the first deformation rate calculator 213a for a fixed time period, and determines the amount of deformation of the bumper face 203 by the integration calculation of the deformation rates in the fixed time period.

The first deformation comparator 215a compares the deformation rate calculated by the first deformation rate calculator 213a with a predetermined deformation rate threshold, and also compares the deformation amount calculated by the first deformation amount calculator 214a with a predetermined deformation amount threshold. When both of the deformation rate and deformation amount are equal to or more than the thresholds, a collision signal is provided.

The second and third collision detectors 212b and 212c have the same configuration and component function as the first collision detector 212a, and will not be described. Collision signals supplied from the first, second and third collision detectors 212a, 212b and 212c are received by the first, second and third collision determiners 216a, 216b and 216c, respectively.

The first collision determiner 216a receives a collision signal supplied from the first collision detector 212a and refers to the operating states of the second and third timers 211b and 211c. When determining that either of the second and third timers 211b and 211c is in operation while the collision signal is supplied from the first collision detector 212a, the first collision determiner 216a outputs a collision determination signal. The actuating signal output 217a receives the collision determination signal supplied from the first collision determiner 216a.

The second collision determiner 216b receives a collision signal supplied from the second collision detector 212b and refers to the operating states of the first and third timers 211a and 211c. When determining that either of the first and third timers 211a and 211c is in operation while the collision signal is supplied from the second collision detector 212b, the second collision determiner 216b outputs a collision determination signal to the actuating signal output 217a.

The third collision determiner 216c receives a collision signal supplied from the third collision detector 212c and refers to the operating states of the first and second timers 211a and 211b. When determining that either of the first and second timers 211a and 211b is in operation while the collision signal is supplied from the third collision detector 212c, the third collision determiner 216c outputs a collision determination signal to the actuating signal output 217a.

The actuating signal output 217a outputs an actuating signal to the actuators 206a and 206b when receiving a collision determination signal from any of the first, second and third collision determiners 216a, 216b and 216c.

Figure 8A:
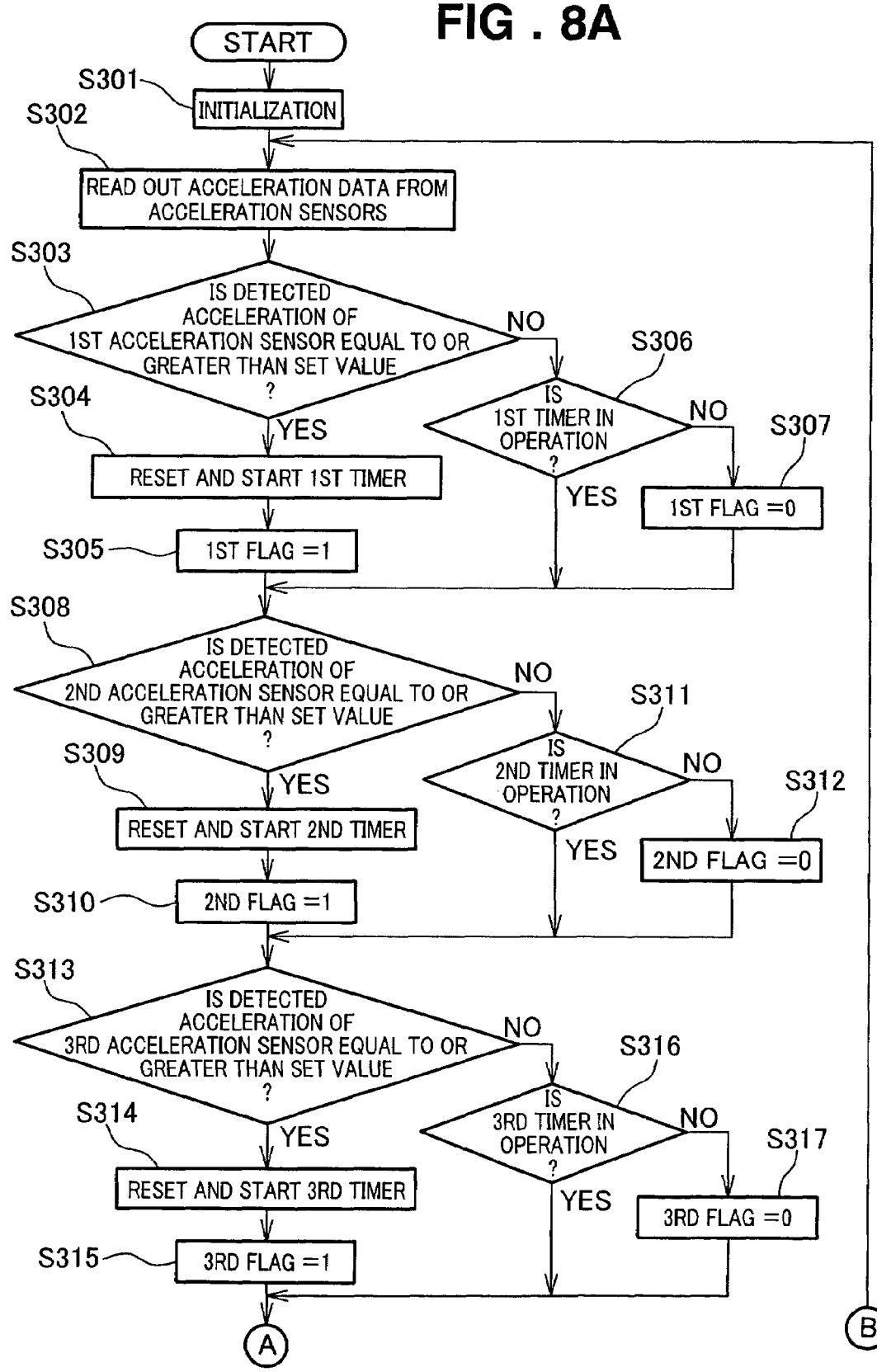

Now, an operation of the collision determination system in the second embodiment shown in FIG. 7 will be described with reference to flowcharts shown in FIGS. 8A and 8B.

At the start of operation of the collision determination system, various parameters (vehicle speed, deformation rate, deformation amount and the values of flags) for use in collision determination are first initialized (step S301). Accelerations supplied from the acceleration sensors 202a, 202b and 202c are read (step S302), and then the first acceleration comparator 210a makes a comparison to determine whether or not the detected acceleration of the first acceleration sensor 202a is equal to or more than the set value (step S303).

When the first acceleration comparator 210a determines that the detected acceleration of the first acceleration sensor 202a is equal to or more than the set value, the timer value of the first timer 211a is reset to start (step S304) and the value of a first flag is set at 1 (step S305).

When the first acceleration comparator 210a determines that the detected acceleration is less than the set value, it is checked whether or not the first timer 211a is in operation (step S306). When the first timer 211a is in operation (the value of the first flag is 1), the process directly proceeds to step S308. When the first timer 211a is not in operation, the value of the first flag is turned to 0 (step S307). Through the operation of steps S303 to S307, once the detected acceleration of the first acceleration sensor 202a becomes equal to or more than the set value (the value of the first flag is 1), the value of the first flag is maintained at 1 for a predetermined fixed time period even if the acceleration then becomes less than the set value during that period.

In step S308, the second acceleration comparator 210b makes a comparison to determine whether or not the detected acceleration is equal to or more than the set value. When the second acceleration comparator 210b determines that the acceleration is equal to or more than the set value, the timer value of the second timer 211b is reset to start (step S309) and the value of a second flag is set at 1 (step S310).

When the second acceleration comparator 210b determines that the detected acceleration is less than the set value, it is checked whether or not the second timer 211b is in operation (step S311). When the second timer 211b is in operation, the process proceeds to step S313. When the second timer 211b is not in operation, the value of the second flag is turned to 0 (step S312). Through the operation of steps S308 to S312, once the detected acceleration of the second acceleration sensor 202b becomes equal to or more than the set value, the value of the second flag is maintained at 1 for a fixed time period even if the acceleration becomes less than the set value during that period.

In step S313, the third acceleration comparator 210c determines whether or not the detected acceleration is equal to or more than the set value. When the third acceleration comparator 210c determines that the acceleration is equal to or more than the set value, the timer value of the third timer 211c is reset to start (step S314) and the value of a third flag is set at 1 (step S315).

When the third acceleration comparator 210c determines that the detected acceleration is less than the set value, it is checked whether or not the third timer 211c is in operation (step S316). When the third timer 211c is in operation, the process proceeds to step S318 shown in FIG. 8B. When the third timer 211c is not in operation, the value of the third flag is turned to 0 (step S317). Through the operation of steps S313 to S317, once the detected acceleration of the third acceleration sensor 202c becomes equal to or more than the set value, the value of the third flag is maintained at 1 for a fixed time period even if the acceleration becomes less than the set value during that period.

The speed calculator 208 shown in FIG. 7 calculates the current vehicle speed from the period of a pulse signal supplied from the speed sensor 204 (step S318). The speed comparator 209 determines whether or not the current vehicle speed is equal to or more than the set value (step S319). When the current vehicle speed is equal to or more than the set value, the process proceeds to step S320.

In step S320, the first, second and third collision detectors 212a, 212b and 212c each calculate the deformation rate and the amount of deformation and compare the results with the thresholds. When the speed comparator 209 determines that the current vehicle speed is less than the set value, the process returns to step S302.

When the speed comparator 209 determines that the current vehicle speed is equal to or more than the set value (step S319) and the calculations of the deformation rate and the amount of deformation and the comparisons with the thresholds are performed (step S320), the first collision detector 212a determines whether or not a collision is detected (step S321). When the first collision detector 212a determines that a collision is detected, it is determined whether or not the value of the second flag or third flag is 1 (step S322). When it is determined that the value of the second flag or third flag is 1, that is, it is determined that the second timer 211b or third timer 211c is in operation, the first collision determiner 216a outputs a collision determination signal (step S323).

When the first collision detector 212a determines that no collision is detected, or the second flag and third flag are 0, the process proceeds to step S324.

In step S324, the second collision detector 212b determines whether or not a collision is detected. When the second collision detector 212b determines that a collision is detected, it is determined whether or not the value of the first flag or third flag is 1 (step S325). When it is determined that the value of the first flag or third flag is 1, that is, it is determined that the first timer 211a or third timer 211c is in operation, the second collision determiner 216b outputs a collision determination signal (step S326).

When the second collision detector 212b determines that no collision is detected, or the first flag and third flag are 0, the process proceeds to step S327.

In step S327, the third collision detector 212c determines whether or not a collision is detected. When the third collision detector 212c determines that a collision is detected, it is determined whether or not the value of the first flag or second flag is 1 (step S328). When it is determined that the value of the first flag or second flag is 1, that is, it is determined that the first timer 211a or second timer 211b is in operation, the third collision determiner 216c outputs a collision determination signal (step S329). When the third collision detector 212c determines that no collision is detected, or the first flag and second flag are 0, the process returns to step S302.

When any of the first, second and third collision determiners 216a, 216b and 216c outputs a collision determination signal (step S323, S326 or S329), an actuating signal is supplied to the actuators 206a and 206b (step S330), and the operation is finished.

Figure 9:
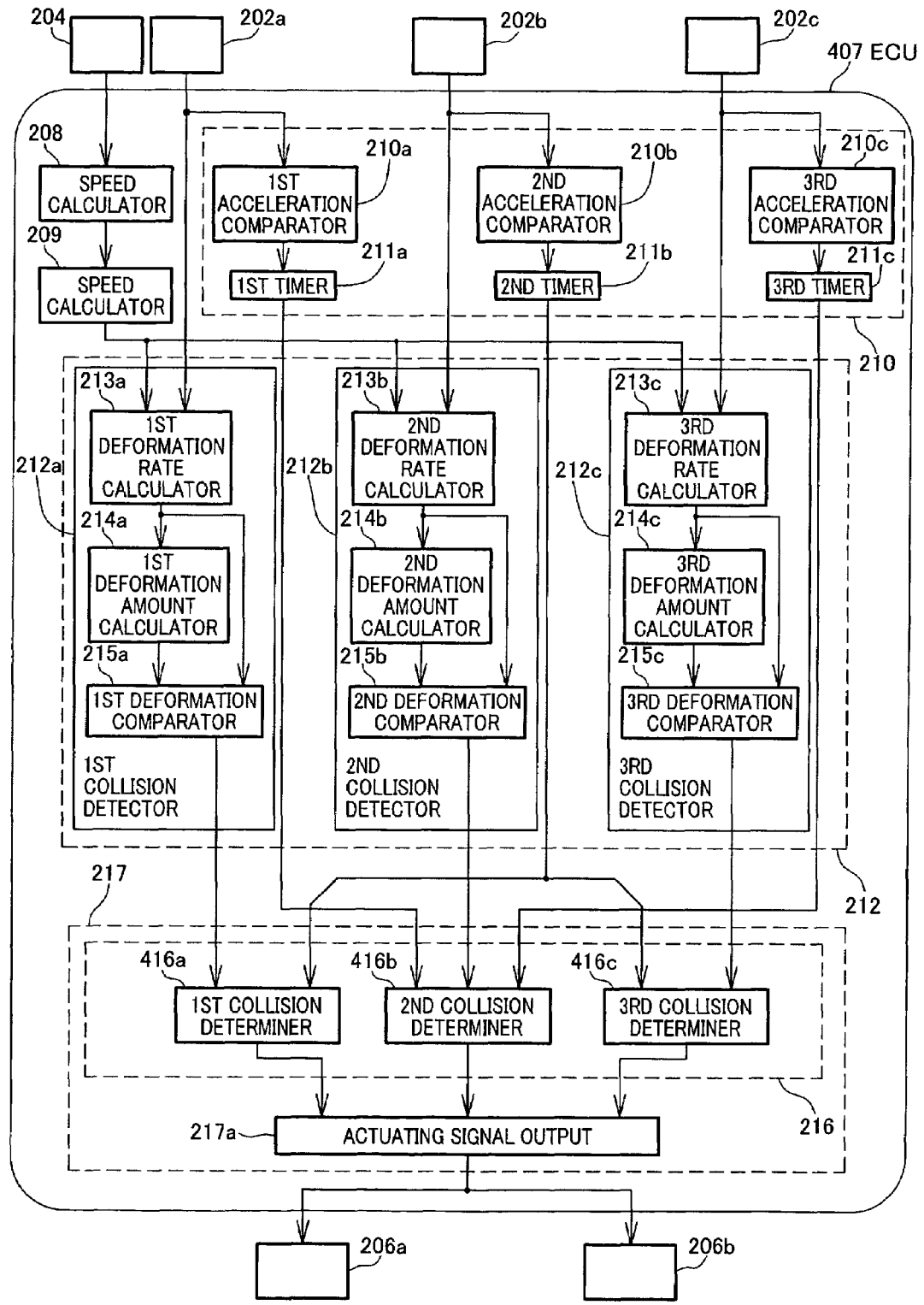
FIG. 9 is an electrical functional block diagram of an ECU in a collision determination system according to a third embodiment of the present invention.

Now, a collision determination system according to a third embodiment will be described with reference to FIG. 9. In an electrical functional block diagram of an ECU 407 in the third embodiment shown in FIG. 9, members identical to those in the second embodiment shown in FIG. 7 are affixed identical reference numerals, and will not be described in detail. The third embodiment shown in FIG. 9 is different from the second embodiment shown in FIG. 7 especially in references and the operation of first, second and third collision determiners 416a, 416b and 416c. Only the differences will be described.

The first collision determiner 416a receives a collision signal from a first collision detector 212a and refers to the operating state of a second timer 211b. When determining that the second timer 211b is in operation upon receiving the collision signal from the first collision detector 212a, the first collision determiner 416a outputs a collision determination signal to an actuating signal output 217a.

The second collision determiner 416b receives a collision signal from a second collision detector 212b and refers to the operating states of first and third timers 211a and 211c. When determining that the first or third timer 211a or 211c is in operation upon receiving the collision signal from the second collision detector 212b, the second collision determiner 416b outputs a collision determination signal to the actuating signal output 217a.

The third collision determiner 416c receives a collision signal from a third collision detector 212c and refers to the operating state of the second timer 211b. When determining that the second timer 211b is in operation upon receiving the collision signal from the third collision detector 212c, the third collision determiner 416c outputs a collision determination signal to the actuating signal output 217a.

Figure 10:
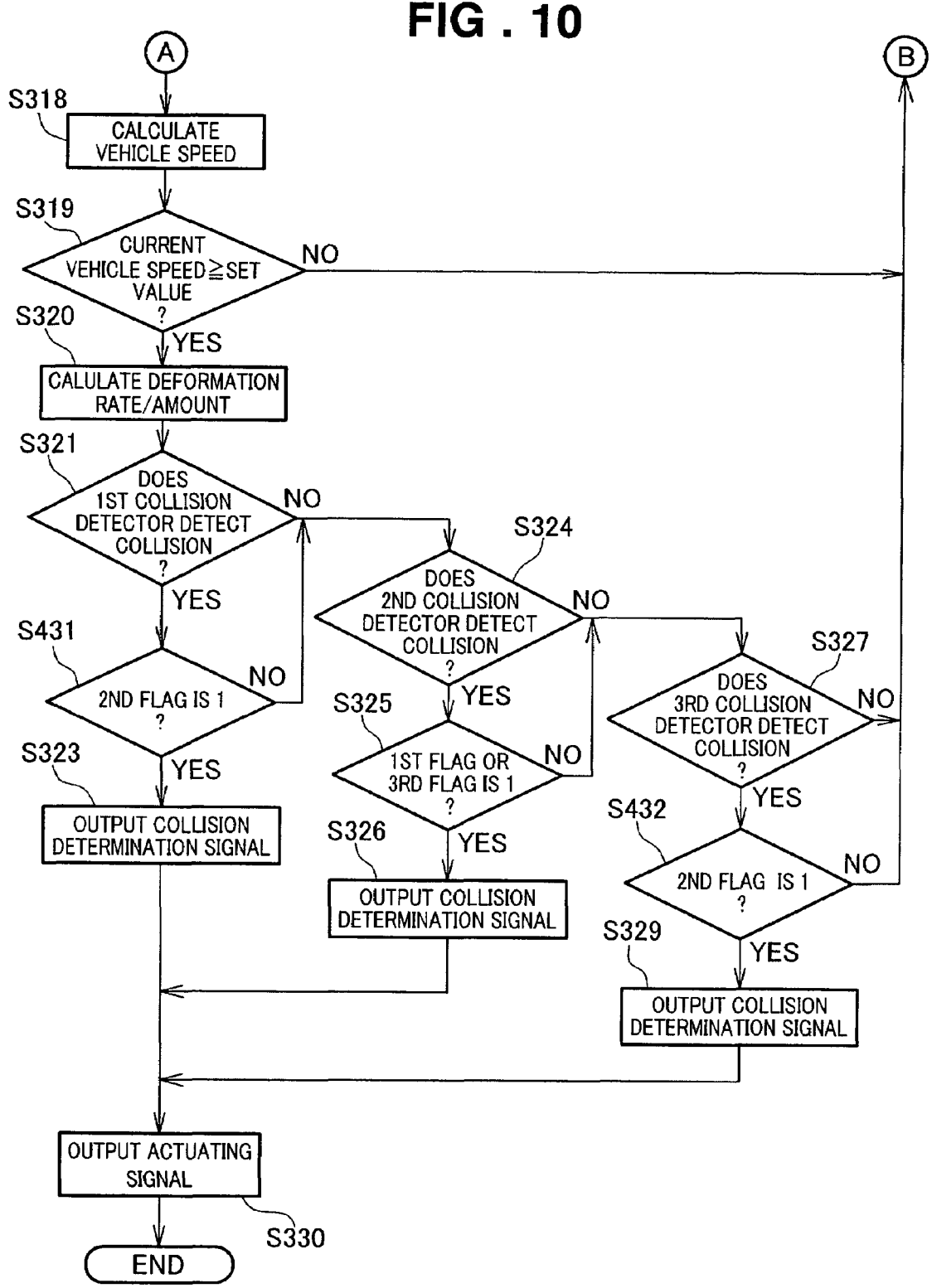
FIG. 10 is a flowchart of the operation of the collision determination system according to the third embodiment, corresponding to the flowchart of the second embodiment shown in FIG. 8B.
Figure 11:
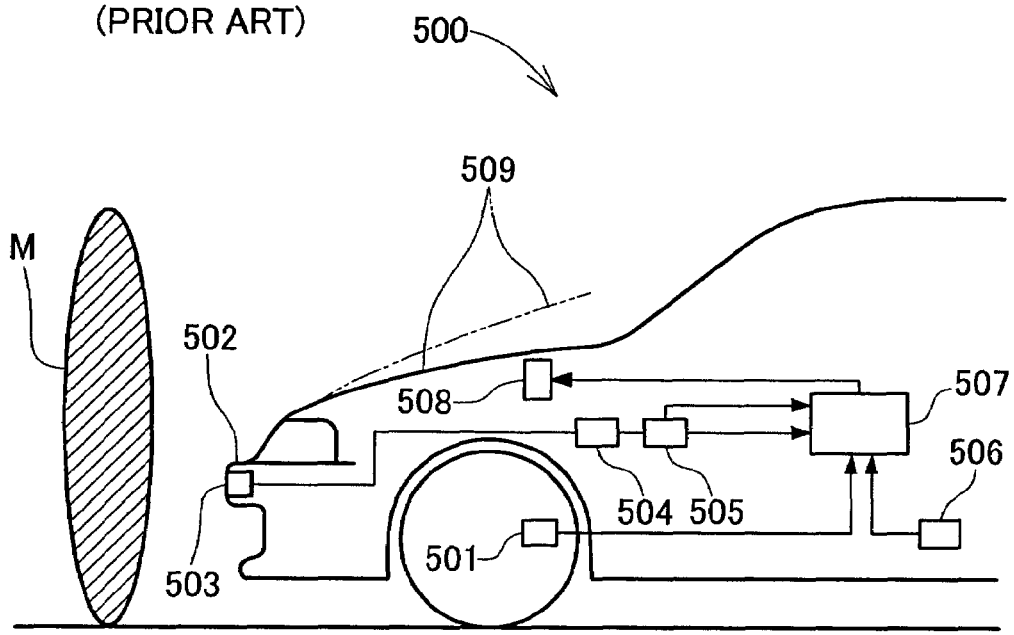
FIG. 11 is an overall view showing a vehicle hood actuating system with a conventional collision determination system.

Now, an operation of the collision determination system in the third embodiment shown in FIG. 9 will be described with reference to a flowchart shown in FIG. 10. The flowchart shown in FIG. 10 corresponds to the flowchart shown in FIG. 8B and is a continuation of the flowchart of FIG. 8A. In the flowchart shown in FIG. 10, steps substantially identical to those in the second embodiment shown in FIG. 8B are affixed identical reference numerals and will not be described in detail. The flowchart shown in FIG. 10 has differences only in steps S322 and S328 shown in FIG. 8, and only steps S431 and S432 in FIG. 10 corresponding to those steps will be described.

The first collision detector 212a determines whether or not a collision is detected (step S321). When the first collision detector 212a determines that a collision is detected, it is determined whether or not the value of a second flag is 1 (step S431). When it is determined that the value of the second flag is 1, that is, it is determined that the second timer 211b is in operation, the first collision determiner 416a outputs a collision determination signal (step S323).

When the first collision detector 212a determines that no collision is detected in step S321, or it is determined that the value of the second flag is 0, the process proceeds to step S324.

In step S324, the second collision detector 212b determines whether or not a collision is detected. When the second collision detector 212b determines that a collision is detected (step S324), it is determined whether or not the value of a first flag or third flag is 1 (step S325). When it is determined that the value of the first flag or third flag is 1, that is, it is determined that the first timer 211a or third timer 211c is in operation, the second collision determiner 416b outputs a collision determination signal (step S326).

When the second collision detector 212b determines that no collision is detected in step S324, or it is determined that both the first and third flags are 0, the process proceeds to step S327.

In step S327, the third collision detector 212c determines whether or not a collision is detected. When the third collision detector 212c determines that a collision is detected (step S327), it is determined whether or not the value of the second flag is 1 (step S432). When it is determined that the value of the second flag is 1, that is, it is determined that the second timer 211b is in operation, the third collision determiner 416c outputs a collision determination signal (step S329). When the third collision detector 212c detects no collision in step S327, or the value of the second flag is 0 in step S432, the process returns to step S302 shown in FIG. 8A.

When any of the first, second and third collision determiners 416a, 416b and 416c outputs a collision determination signal (step S323, S326 or S329), an actuating signal is supplied to actuators 6a and 6b (step S330), and the operation is finished.

The second and third embodiments have been described with three acceleration sensors, but the number of acceleration sensors is not limited to three and may be two or more than three.

The present disclosure relates to the subject matters of Japanese Patent Applications No. 2002-183964 and No. 2002-183998, both filed Jun. 25, 2002, the disclosures of which are expressly incorporated herein by reference in their entireties.

What is claimed is:

1. A collision determination system for detecting a collision of a vehicle with an object and outputting an actuating signal to collision mitigating devices, said system comprising:
  a plurality of acceleration sensors for mounting to a front portion of said vehicle to detect accelerations of movement of said front portion in the vehicle longitudinal direction;
  an actuation permitting means for outputting an actuation permitting signal for a fixed time period when one of said acceleration sensors detects an acceleration equal to or more than a set value within a set time after another acceleration sensor detects an acceleration equal to or more than the set value, said actuation permitting means including a plurality of timers, each of said timers being associated with a respective one of the acceleration sensors, said each of said timers holding for the set time a signal representing the acceleration detected by the associated acceleration sensor which is equal to or more than the set value;
  a collision detecting means for outputting a collision detection signal when determining that a collision with a given object occurs based on acceleration detected by at least one of said acceleration sensors; and
  an actuating signal outputting means for outputting an actuating signal to said collision mitigating devices when receiving both an actuation permitting signal from said actuation permitting means and a collision detection signal from said collision detecting means.

2. A collision determination system according to claim 1, wherein a control unit including said actuation permitting means, collision detecting means and actuating signal outputting means is mounted in a position different from that of said acceleration sensors.

3. A collision determination system for detecting a collision of a vehicle with an object and outputting an actuating signal to collision mitigating devices, said system comprising:
  a plurality of acceleration sensors for mounting to a front portion of said vehicle to detect accelerations of movement of said front portion in the vehicle longitudinal direction;
  a plurality of collision detecting means provided in correspondence with said respective acceleration sensors to perform calculations with said detected accelerations detected by said acceleration sensors, thereby to detect a collision of said vehicle with said object;

a plurality of acceleration comparing means provided in correspondence with said respective acceleration sensors to determine whether or not said detected accelerations detected by said acceleration sensors are equal to or more than a set value; and an actuating signal outputting means for outputting an actuating signal when determining that any of said collision detecting means detects a collision and any of said acceleration comparing means referring to one of said acceleration sensors, which is different from the acceleration sensor referred to by said collision detecting means detecting the collision, has detected an acceleration equal to or more than the set value during a predetermined past time period before the collision detection, said acceleration comparing means each including a timer, said each of said timers holding for the predetermined past time period a signal representing the acceleration detected by the corresponding acceleration sensor which is equal to or more than the set value.

4. A collision determination system according to claim 3, wherein said actuating signal outputting means outputs an actuating signal under such conditions that any of said collision detecting means detects a collision and the acceleration comparing means referring to the acceleration sensor mounted adjacent to the acceleration sensor referred to by said collision detecting means detecting the collision has detected an acceleration equal to or more than the set value during the predetermined past time period before the collision detection.

5. A collision determination system according to claim 3, wherein a control unit including said collision detecting means, acceleration comparing means and actuating signal outputting means is mounted in a position different from that of said acceleration sensors.

6. A collision determination system for detecting a collision of a vehicle with an object and outputting an actuating signal to collision mitigating devices, said system comprising:

a plurality of acceleration sensors for mounting to a front portion of said vehicle to detect accelerations of movement of said front portion in the vehicle longitudinal direction;

an actuation permitter that outputs an actuation permitting signal for a fixed time period when one of said acceleration sensors detects an acceleration equal to or more than a set value within a set time after another acceleration sensor detects an acceleration equal to or more than the set value, said actuation permitter including a plurality of timers, each of said timers being associated with a respective one of the acceleration sensors, said each of said timers holding for the set time a signal representing the acceleration detected by the associated acceleration sensor which is equal to or more than the set value;

a collision detector that outputs a collision detection signal when determining that a collision with a given object occurs based on acceleration detected by at least one of said acceleration sensors, wherein said collision detector includes a deformation rate calculator; and an actuating signal output that outputs an actuating signal to said collision mitigating devices when receiving both an actuation permitting signal from said actuation permitter and a collision detection signal from said collision detector.

7. A collision determination system according to claim 6, wherein a control unit including said actuation permitter, said collision detector and said actuating signal output is mounted in a position different from that of said acceleration sensors.

8. A collision determination system for detecting a collision of a vehicle with an object and outputting an actuating signal to collision mitigating devices, said system comprising:

a plurality of acceleration sensors for mounting to a front portion of said vehicle to detect accelerations of movement of said front portion in the vehicle longitudinal direction;

a plurality of collision detectors provided in correspondence with said respective acceleration sensors to perform calculations with said detected accelerations detected by said acceleration sensors, thereby to detect a collision of said vehicle with said object, wherein said collision detectors each include a deformation rate calculator;

a plurality of acceleration comparators provided in correspondence with said respective acceleration sensors to determine whether or not said detected accelerations detected by said acceleration sensors are equal to or more than a set value; and an actuating signal output that outputs an actuating signal when determining that any of said collision detectors detect a collision and any of said acceleration comparators referring to one of said acceleration sensors, which is different from the acceleration sensor referred to by said collision detector detecting the collision, has detected an acceleration equal to or more than the set value during a predetermined past time period before the collision detection, said acceleration comparators each including a timer, said each of said timers holding for the predetermined past time period a signal representing the acceleration detected by the corresponding acceleration sensor which is equal to or more than the set value.

9. A collision determination system according to claim 8, wherein said actuating signal output outputs an actuating signal under such conditions that any of said collision detectors detects a collision and the acceleration comparator referring to the acceleration sensor mounted adjacent to the acceleration sensor referred to by said collision detector detecting the collision has detected an acceleration equal to or more than the set value during the predetermined past time period before the collision detection.

10. A collision determination system according to claim 8, wherein a control unit including said collision detectors, said acceleration comparators and said actuating signal output is mounted in a position different from that of said acceleration sensors.

\* \* \* \* \*